United States Patent Office 3,427,147
Patented Feb. 11, 1969

3,427,147
IMINODIOXOLANES AS HERBICIDES
Heinz J. Dietrich, Bethany, George G. King, New Haven, and Joseph V. Karabinos, Orange, Conn., assignors to Olin Mathieson Chemical Corporation
No Drawing. Filed Aug. 15, 1966, Ser. No. 572,210
U.S. Cl. 71—88    4 Claims
Int. Cl. A01m 9/28; C07d 13/04

ABSTRACT OF THE DISCLOSURE

Wallach's compound having the formula

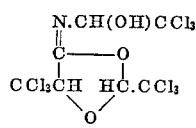

is applied as a herbicide for controlling the growth of grasses.

This invention relates to herbicidal compositions and methods in which 2,5-bis(trichloromethyl)-N-(1-hydroxy-2,2,2-trichloroethyl)-4-iminodioxolane is the essential herbicidal ingredient.

This compound was first prepared by Wallach, Ann. 173, 297 (1874) and later by Crowther et al., J. Chem. Soc. 105, 933 (1914) and Bowman et al., J. Chem. Soc. 1963, 692 by the reaction of chloral and aqueous potassium cyanide. The structure of the compound was established by Franck et al., J. Org. Chem. 30, 1670 (1965) as:

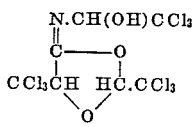

Crowther et al. also prepared the acetate, benzoate and ethylcarbonato-esters of Wallach's compound.

The compound 2,5-bis(trichloromethyl)-N-(1-hydroxy-2,2,2-trichloroethyl)-4-iminodioxolane is an extremely effective herbicide and valuable herbicidal formulations containing this compound are provided in accordance with this invention. The chemical is active as a post-emergence herbicide, but it is especially valuable as a pre-emergence herbicide since it is unusually selective in killing grasses when applied in this manner. The method of this invention thus comprises applying a herbicidal amount of 2,5-bis(trichloromethyl) - N - (1 - hydroxy-2,2,2-trichloroethyl)-4-iminodioxolane to the locus to be protected from undesirable grass growth. It is, with particular advantage, applied directly to soil areas in pre-emergence treatment.

When the chemical is applied to the soil in pre-emergence treatment, the growth of valuable crops, for example, cotton and corn in that area is only relatively slightly affected. However, the growth of a wide variety of undesirable grasses in the treated area is nearly completely prevented. The compound used according to this invention is also active against various broad-leaved weeds including pigweed in pre-emergence treatment but it is particularly useful in preventing the growth of grasses, for example, rye grass, crab grass and Johnson grass. It is advantageously applied to railroad and other rights-of-way to prevent the growth of grasses.

Although the compound used according to this invention may be directly administered to the area where control of grasses is desired, it is preferably admixed with carriers, diluents and suitable pest control adjuvants. Thus a wide variety of such adjuvants may be utilized with the herbicide of this invention to provide herbicidal formulations conveniently adapted for application using conventional applicator equipment. In this respect, both solid and liquid herbicidal formulations containing the compound used according to this invention as the essential active ingredient are provided in accordance with this invention.

Dust compositions are readily provided by mixing the active ingredient with various free-flowing solid carriers and grinding the resulting mixture to obtain a dust having an average particle size of about 20 to 50 microns. Concentration by weight of the active ingredient in these dusts is generally in the range of about 5 to 20% although higher concentrations may be utilized if desired. Among the solid carriers which may be employed in such formulations are natural clays, for example, attapulgite and kaolinite clays, diatomaceous earth, finely divided talcs and synthetic mineral fillers derived from silica and silicates, for example, synthetic fine silica and synthetic calcium and magnesium silicates. Other suitable carriers include magnesium and calcium carbonates.

The compound used in the method of this invention is advantageously formulated with other carriers to provide wettable powders. These powders are conveniently prepared by mixing the active ingredient with solid carriers as described above and adding to the mixture a surface-active agent in amount sufficient to impart water dispersibility to the powdered compositions. Aqueous dispersions of such wettable powders are particularly adapted for spraying and sprinkling operations on areas which are to be protected from the growth of grasses.

Numerous surface-active agents are available and suitable for use in such wettable powders. These agents are referred to as wetting or dispersing agents, and they are of the nonionic, cationic or anionic type. Mixtures of such agents are conveniently employed in these formulations in a manner well known to those skilled in this art. For example, among those surface-active agents commonly employed in these compositions are alkyl aryl sulfonates such as sodium decyl benzene sulfonate, fatty alcohol sulfates such as sodium dodecyl sulfate, alkali metal oleates, sodium lignosulfonate and the like. A comprehensive listing of many other surface-active agents suitable for use in the formulation of agricultural dispersions, suspensions and other formulations appears in McCutcheon, "Soap and Chemical Specialties," 31, Nos. 7–10 (1955).

Wettable powders usually contain about 0.1 to 10.0% by weight of the surface-active agents. The preferred concentration depends upon the nature of the system in which the agent is used and the particular type of application technique employed. Wettable powders containing about 2 to 5% of these surface-active agents are generally suitable.

Other solid herbicidal compositions containing the active ingredient are provided in accordance with this invention by dissolving the chemical in a volatile solvent, for example, alcohol, and impregnating this solution upon granular solids, suitably on attapulgite clay, ground vegetable shells or walnut shells. Upon removal of the solvent, potent solid herbicidal formulations are obtained.

Similarly, suspension-type formulations may be conveniently prepared containing the active ingredient. For example, an alcohol solution of the compound containing one of the above listed dispersing agents is added to water to provide suspensions which are especially suitable for spraying operations.

The amount of active ingredient applied to the area to be protected is sufficient to exert the desired herbicidal action. Different amounts of the active ingredient are suitably applied to achieve a desired result depending upon the extent and nature of weed growth, application procedures and other features. Effective herbicidal action can be obtained by applying the active compound at a rate of about 1 to 10 pounds per acre, preferably about 5 pounds per acre in most applications. The formulations utilized may contain from 0.5% to about 90% by weight of the active ingredient, depending upon the particular results desired, the particular locus and method of application.

The monochloroacetate, dichloroacetate, propionate, butyrate, beta-chloropropionate, o-chlorobenzoate, p-chlorobenzoate, ethyl thiocarbonato- and phenyl thiocarbonato- esters of Wallach's compound were also prepared but failed to pass the herbicide test.

The following examples illustrate in detail how 2,5-bis-(trichloromethyl)-N-(1-hydroxy - 2,2,2 - trichloroethyl)-4-iminodioxolane is effectively employed as a selective herbicide in accordance with this invention. They also illustrate the preparation of other effective herbicidal formulations containing the compound used according to this invention. Those skilled in the art will recognize that other methods of application and other effective formulations are also conveniently utilized.

EXAMPLE I

Experimental method

The desired crops were uniformly planted in ordinary potting soil in 12 x 14 inch flats. Uniform volumes of soil were used to cover the seeds so that all seeds would be at a uniform depth. The top of the soil in the flats was then uniformly pressed with a template. The desired amount of chemical was suspended in 250 ml. of water and the total quantity uniformly added to the top of the soil as a drench treatment. The chemical is thus incorporated in the soil by downward penetration. The seed germination or emergence of the several crops was determined nine days after treatment and final records of phytotoxicity were obtained 14 days after the start of the test.

The samples used in the present test were wettable powder preparations. Dosages give the concentration of the active ingredient.

Experimental results

The pre-emergence action of these materials was measured by (1) emergence count and (2) phytotoxicity ratings of seedling plants. The latter were examined after two weeks and a scoring system of 0 to 10 was employed. A 0 phytotoxicity rating indicates no injury and 10 indicates that all plants were killed. These phytotoxicity ratings and the emergence values, taken 9 days after planting, are presented in Table I.

The compound used according to this invention was particularly active against the grasses, oats, wheat and milo. The activity of this chemical against Johnson grass is particularly marked and unexpected. Complete kill was obtained at all dosage levels investigated. This chemical is very specific against grasses and very active against Johnson grass at the dosage levels tested. The chemical was also very active against pigweed.

The broad-leaved crops listed in Table I were only slightly affected by the chemical. Cotton, soybeans, peanuts and tomatoes tolerated the chemical well. A particularly valuable economic application of this chemical is in broadcast application as a pre-emergence herbicide to prevent grass growth in fields of these crops. Other chemicals used for pre-emergence control frequently also have serious adverse effects on the desired crops.

TABLE I

| Crop | Emerged, percent, lb./acre | | | Phytotoxicity, lb./acre | | |
|---|---|---|---|---|---|---|
| | 10 | 2 | 2.5 | 10 | 5 | 2.5 |
| Johnson grass | 20 | 12 | 22 | 10 | 10 | 10 |
| Oats | 96 | 100 | 96 | 8 | 6 | 4 |
| Wheat | 88 | 100 | 92 | 10 | 10 | 8 |
| Milo | 88 | 88 | 92 | 9 | 7 | 5 |
| Pigweed | 14 | 14 | 22 | 8 | 7 | 5 |
| Beets | 68 | 80 | 100 | 5 | 5 | 1 |
| Radish | 72 | 84 | 88 | 3 | 2 | 0 |
| Tomato | 64 | 96 | 88 | 2 | 0 | 0 |
| Cucumber | 100 | 87 | 80 | 5 | 4 | 3 |
| Lima beans | 87 | 100 | 87 | 5 | 4 | 3 |
| Turnip | 72 | 88 | 84 | 6 | 4 | 0 |
| Cotton | 70 | 65 | 65 | 4 | 2 | 0 |
| Soybeans | 65 | 80 | 80 | 5 | 4 | 2 |
| Peanuts | 100 | 100 | 67 | 4 | 2 | 1 |

EXAMPLE II

Dust compositions containing 2,5-bis(trichloromethyl)-N-(1 - hydroxy - 2,2,2 - trichloroethyl)-4-iminodioxolane which are effective herbicidal formulations are also provided in accordance with this invention. For example, a suitable dust formulation is prepared by mixing 6 parts by weight of the active ingredient with 94 parts by weight of attapulgite clay and grinding the mixture to provide a dust having an average particle size of about 30 to 50 microns.

EXAMPLE III

A wettable powder suitable for dispersion in water is prepared in the following manner. The 2,5-bis(trichloromethyl)-N-(1-hydroxy - 2,2,2 - trichloroethyl)-4-iminodioxolane in the amount of 5 parts by weight was thoroughly mixed together with 0.3 part by weight of sodium N-methyl-N-oleoyltaurate, 0.2 part by weight of sodium lignosulfonate and 4.5 parts by weight of Barden clay. The mixture was ground to provide a powder having an average particle size of about 30 microns. The resulting wettable powder when dispersed in an appropriate volume of water is readily applied to crop and weed areas by spraying techniques, and effective selective control of undesirable grasses is obtained.

What is claimed is:
1. Method for controlling the growth of grasses which comprises applying the compound, 2,5-bis(trichloromethyl)-N-(1-hydroxy - 2,2,2 - trichloroethyl)-4-iminodioxolane to the area to be protected in an amount sufficient to exert herbicidal action.
2. Method as claimed in claim 1 in which said amount is from 1 to 10 pounds per acre.
3. Method as claimed in claim 1 in which said compound is applied as a water dispersion of a wettable powder containing clay diluent and a surfactant admixed with said compound.
4. Method as claimed in claim 3 in which said clay diluent is Barden clay and said surfactant is sodium N-methyl-N-oleyltaurate.

References Cited

UNITED STATES PATENTS

| | | | |
|---|---|---|---|
| 3,077,393 | 2/1963 | Howard et al. | 71—88 |
| 3,189,429 | 6/1965 | Olin | 71—90 |
| 3,247,223 | 4/1966 | Walsh et al. | 260—340.9 |
| 3,287,371 | 11/1966 | Middleton | 260—340.9 |
| 3,344,148 | 9/1967 | Dietrich et al. | 71—88 |

OTHER REFERENCES

Franck et al.: "The Structure of Wallach's Compound," J. Org. Chem. 30, pp. 1670–71 (1965).

LEWIS GOTTS, *Primary Examiner.*

G. HOLLRAH, *Assistant Examiner.*

U.S. Cl. X.R.

260—340.9